(12) United States Patent
Nakamura et al.

(10) Patent No.: US 7,959,358 B2
(45) Date of Patent: Jun. 14, 2011

(54) HUB UNIT FOR DRIVING WHEEL

(75) Inventors: Yuji Nakamura, Kanagawa-ken (JP);
Hirohide Ishida, Kanagawa-ken (JP);
Junshi Sakamoto, Kanagawa-ken (JP);
Toshiaki Maeda, Kanagawa-ken (JP)

(73) Assignee: NSK Ltd., Tokyo (JP)

( * ) Notice: Subject to any disclaimer, the term of this patent is extended or adjusted under 35 U.S.C. 154(b) by 1087 days.

(21) Appl. No.: 10/576,089

(22) PCT Filed: Oct. 1, 2004

(86) PCT No.: PCT/JP2004/014904
§ 371 (c)(1),
(2), (4) Date: Feb. 6, 2007

(87) PCT Pub. No.: WO2005/036183
PCT Pub. Date: Apr. 21, 2005

(65) Prior Publication Data
US 2007/0278851 A1 Dec. 6, 2007

(30) Foreign Application Priority Data

Oct. 14, 2003 (JP) ................... 2003-354022
Apr. 2, 2004 (JP) ................... 2004-110578

(51) Int. Cl.
*F16C 41/00* (2006.01)
*F16C 19/18* (2006.01)
*F16C 33/58* (2006.01)

(52) U.S. Cl. ........................ 384/448; 384/544

(58) Field of Classification Search .......... 384/448, 384/544
See application file for complete search history.

(56) References Cited

U.S. PATENT DOCUMENTS

| 5,470,157 | A | * | 11/1995 | Dougherty et al. | ........... 384/448 |
| 5,628,570 | A | | 5/1997 | Sahashi et al. | |
| 5,633,437 | A | | 5/1997 | Bernasconi et al. | |
| 5,902,065 | A | | 5/1999 | Forestiero et al. | |
| 5,975,761 | A | | 11/1999 | Ouchi et al. | |
| 6,254,276 | B1 | | 7/2001 | Ouchi et al. | |

FOREIGN PATENT DOCUMENTS

| DE | 696 20 916 T2 | 11/2002 |
| DE | 696 21 891 T2 | 3/2003 |
| EP | 0 767 385 A1 | 4/1997 |
| EP | 0 869 365 A1 | 10/1998 |
| EP | 0 890 107 B1 | 1/1999 |
| EP | 1 672 373 A1 | 6/2006 |
| FR | 2 740 186 A1 | 4/1997 |

(Continued)

OTHER PUBLICATIONS

Supplementary European Search Report dated Nov. 27, 2008 (six (6) pages).

(Continued)

*Primary Examiner* — William C Joyce
(74) *Attorney, Agent, or Firm* — Crowell & Moring LLP

(57) ABSTRACT

A sensor for detecting a speed of rotation is an active sensor, a sensing portion 35 of the sensor directly faces the magnetic encoder 10 without interposition between it and the encoder 10, and a harness 34 (or connector) of the sensor 30 for detecting the speed of rotation is taken out of a gap between a knuckle N and a constant velocity universal joint 9.

2 Claims, 17 Drawing Sheets

FOREIGN PATENT DOCUMENTS

| | | |
|---|---|---|
| JP | 58-92955 A | 6/1983 |
| JP | 2-50517 U | 4/1990 |
| JP | 4-73616 | 6/1992 |
| JP | 6-80177 U | 11/1994 |
| JP | 3009869 U | 2/1995 |
| JP | 8122351 A | 5/1996 |
| JP | 9-218215 A | 8/1997 |
| JP | 10-319027 A | 12/1998 |
| JP | 10-332723 A | 12/1998 |
| JP | 11-23596 A | 1/1999 |
| JP | 11-326355 A | 11/1999 |
| JP | 2000-221202 A | 8/2000 |
| JP | 2000-221203 A | 8/2000 |
| JP | 2000-221204 A | 8/2000 |
| JP | 2000-513804 A | 10/2000 |
| JP | 2001-243928 A | 9/2001 |
| JP | 2001-315501 A | 11/2001 |
| JP | 2003-75194 A | 3/2003 |
| JP | 2003-120703 * | 4/2003 |
| JP | 2003-172347 A | 6/2003 |
| JP | 2003-254985 A | 9/2003 |
| JP | 2004-85560 A | 3/2004 |
| WO | WO 97/15833 A1 | 5/1997 |

OTHER PUBLICATIONS

Japanese Office Action dated Mar. 23, 2010 including English translation (Eight (8) pages).

Japanese Office Action dated Jul. 27, 2010 with English translation (ten (10) pp.).

Decision to Dismiss the Amendment in Japense Patent Application No. 2004-110578 dated Nov. 22, 2010.

International Search Report dated Feb. 1, 2005 with an English translation (seven (7) pages).

* cited by examiner

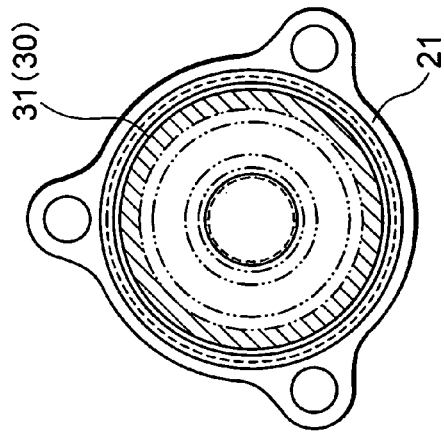
FIG. 9B
FIG. 9C
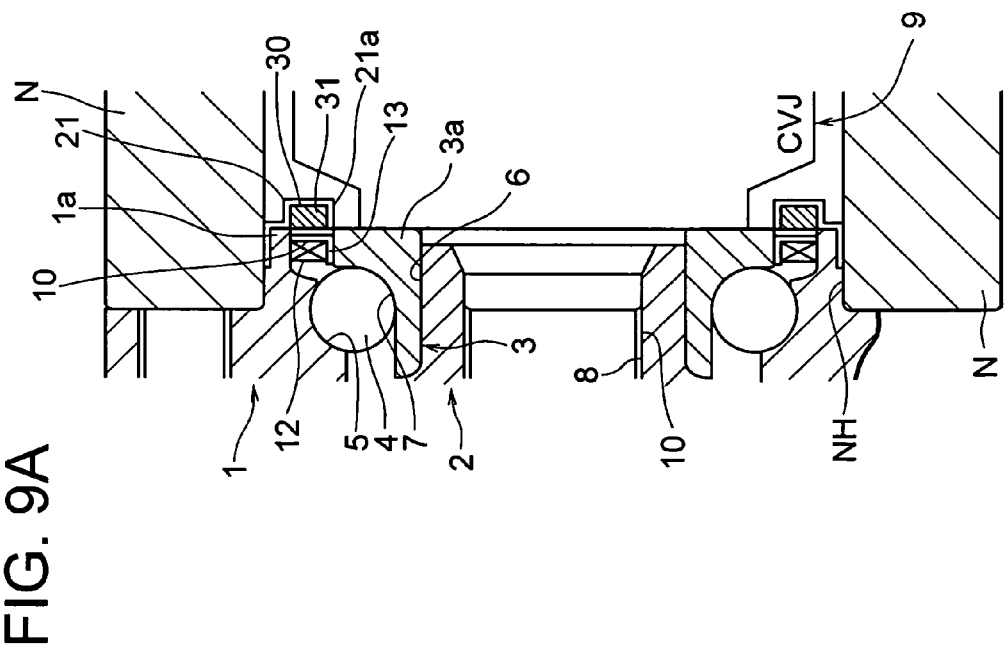
FIG. 9A

HUB UNIT FOR DRIVING WHEEL

TECHNICAL FIELD

The present invention relates to a hub unit for a driving wheel which is provided with, for example, a sensor of a rotation detecting device for ABS and is applied to a wheel supporting structure with a magnetic encoder facing this sensor mounted thereon.

BACKGROUND ART

In a hub unit for a driving wheel, a hub and an inner ring are supported to be rotatable on the inner diameter side of an outer ring of a bearing through a plurality of rolling members.

The outer ring is fixed to a knuckle constituting a suspension system by means of a supporting flange provided on the outer peripheral surface thereof. A plurality of outer ring tracks are provided on the inner peripheral surface of the outer ring, and the hub and the inner ring are supported on the inner diameter side of this outer ring.

The hub is provided with a mounting flange for mounting a wheel in the outer edge portion thereof. A first inner ring track is formed in a middle part of the outer peripheral surface of the hub, and the inner ring is fixedly fitted on a small-diameter step portion of the inner end portion of the hub. This inner ring is formed with a second inner ring track. In a central part of the hub, in case, for example, of a hub unit for a driving wheel, there is provided a female spline for bringing a constant velocity universal joint into spline-fitting to secure.

Also, there is a hub unit with a sensor for detecting a speed of rotation of a vehicle, in order to support a wheel to a suspension system to be rotatable and also to control an antilock brake system (ABS) or traction control system (TCS).

When this hub unit is used, a magnetic encoder which is fixed to the inner ring and is magnetized with a plurality of north poles and south poles alternately in the peripheral direction is rotated upon rotation of the wheel, and an output of the sensor which is provided to face the magnetic encoder is changed. Since the frequency of this output change is proportional to the speed of rotation of the wheel, an output signal of the sensor is inputted to a control unit through a harness to obtain the speed of rotation of the wheel, thereby appropriately controlling the ABS or the TCS.

Note that conventional examples related to the above-described prior art are disclosed in Japanese Patent Laid-Open Application Nos. 2000-221202, 2000-221203 and 2000-221204 which will be described later.

Incidentally, such a hub unit as of the type described above is, after the magnetic encoder or the like has been mounted on the inner ring of the bearing, transported as a unitary hub unit, and thereafter, the outer ring thereof is thread-fixed to a knuckle of the car body with bolts or the like in an assembly process of the car. Thus, the hub unit is mounted on the car body side.

However, in case of the hub unit for the driving wheel, it is arranged such that the sensor for detecting a speed of rotation of the wheel is conventionally mounted on the side of the knuckle of the car body.

Accordingly, it is required to examine whether or not a positional relationship between the sensor for detecting a speed of rotation on the knuckle side of the car body and the magnetic encoder on the hub unit side is appropriate and to adjust it. As a result, the assembling and adjusting processes become complicated.

For these reasons, there is a demand that the sensor for detecting a speed of rotation should also be mounted on the hub unit side in advance, like the magnetic encoder.

However, since the constant velocity universal joint is provided on the inner side of the hub unit in the car width direction, a space for mounting the sensor is comparatively small, so that it is difficult to mount the sensor for detecting a speed of rotation on the hub unit side, and moreover, it is very troublesome to arrange the harness which is extended from the sensor or to prevent interference thereof with the constant velocity universal joint.

Particularly, a code (a harness or a connector) for connecting the sensor is extended out of the knuckle through a hole drilled in the knuckle. However, since the knuckle has to be drilled, the strength of the knuckle is reduced, and the size or the weight of the knuckle may be increased to compensate the reduction. Also, though a space between the knuckle and a constant velocity universal joint CVJ is sufficiently secured conventionally so as to prevent interference by the harness or the connector, the size or the weight of the knuckle may be increased in order to secure such a space for preventing interference by the harness or the connector.

Further, the internal circuit of the sensor is disposed linearly and is sometimes placed out of the cap. Since the sensor is placed out of the fitting diameter of the outer ring as the internal circuit is disposed linearly, it is required to drill the knuckle, or to form a cut-away portion on the knuckle, or to make some similar preparations, which may resultantly decrease the strength of the knuckle. Also, since a space for preventing interference by the harness or the connector is required when the internal circuit is disposed linearly, the size or the weight of the knuckle may be increased.

The present invention has been contrived taking such circumstances as described above into consideration, and an object thereof is to provide a hub unit for a driving wheel which is provided with a sensor for detecting a speed of rotation and can be mounted on a knuckle very easily in an appropriate manner.

DISCLOSURE OF THE INVENTION

In order to achieve the above object, according to a first aspect of the present invention, there is provided a hub unit for a driving wheel, in which:

one track ring out of a stationary ring and a rotary ring is an outer ring having a plurality of outer ring tracks on the inner peripheral surface thereof;

the other track ring of the stationary ring and the rotary ring is an inner ring assembly comprising a shaft member and an inner ring as a separate body combined with each other and having a plurality of inner ring tracks on the outer peripheral surface thereof;

the shaft member is formed with one of the inner ring tracks in a middle part in the axial direction thereof and a small-diameter step portion having a smaller diameter than that of the inner ring track portion at an end portion in the axial direction thereof; and the separate inner ring has the other of the inner ring tracks on the outer peripheral surface thereof and is fitted on the small-diameter step portion, which hub unit comprising:

a sensor holder fixed to the stationary ring of the hub unit for a driving wheel;

a sensor supported by the sensor holder and facing an encoder fixed to the rotary ring to rotate together with the rotary ring; and a harness or connector extended out of the sensor for taking out a detection signal of the sensor, wherein:

the sensor unit includes the sensor and the harness or connector;

all of the portions of the sensor unit which are outside the outer ring in the axial direction and inside a range of a hub unit mounting hole of a knuckle are disposed on the inner side in the radial direction than an inner wall of the hub unit mounting hole of the knuckle;

the harness or connector is disposed on the outer side in the radial direction in a non-contact manner with a constant velocity universal joint in a finished car;

the sensor is an active sensor;

a sensing portion of the sensor directly faces the encoder without interposition between it and the encoder; and the harness or connector is extended out of a gap between the knuckle and the constant velocity universal joint.

In the hub unit for a driving wheel according to the first aspect of the present invention, it is preferable that a gap between the sensor or the sensor holder and a rotary member constituted by at least an end surface of the inner ring, the outer diameter thereof, or the constant velocity universal joint is set to be not less than 0.1 mm and to be smaller than a gap between the constant velocity universal joint and the knuckle.

According to a second aspect of the present invention, there is provided a hub unit for a driving wheel, in which:

one track ring out of a stationary ring and a rotary ring is an outer ring having a plurality of outer ring tracks on the inner peripheral surface thereof;

the other track ring of the stationary ring and the rotary ring is an inner ring assembly comprising a shaft member and an inner ring as a separate body combined with each other and a plurality of inner ring tracks on the outer peripheral surface thereof;

the shaft member is formed with one of the inner ring tracks in a middle part in the axial direction thereof and a small-diameter step portion having a smaller diameter than that of the inner ring track portion at an end portion in the axial direction thereof; and the separate inner ring has the other of the inner ring tracks on the outer peripheral surface thereof and is fitted on the small-diameter step portion, which hub unit comprising:

a sensor holder fixed to the stationary ring of the hub unit for a driving wheel;

a sensor supported by the sensor holder and facing an encoder fixed to the rotary ring to rotate together with the rotary ring;

a harness or connector extended out of the sensor for taking out a detection signal of the sensor; and a sensor unit including the sensor and the harness or connector, wherein:

the sensor is an active sensor; and an internal circuit of the sensor is disposed circumferentially or in an arc inside a cap.

According to a third aspect of the present invention, there is provided a hub unit for a driving wheel, in which:

one track ring out of a stationary ring and a rotary ring is an outer ring having a plurality of outer ring tracks on the inner peripheral surface thereof;

the other track ring of the stationary ring and the rotary ring is an inner ring assembly comprising a shaft member and an inner ring as a separate body combined with each other and a plurality of inner ring tracks on the outer peripheral surface thereof;

the shaft member is formed with one of the inner ring tracks in a middle part in the axial direction thereof and a small-diameter step portion having a smaller diameter than that of the inner ring track portion at an end portion in the axial direction thereof; and the separate inner ring has the other of the inner ring tracks on the outer peripheral surface thereof and is fitted on the small-diameter step portion, which hub unit comprising:

a sensor holder fixed to the stationary ring of the hub unit for a driving wheel;

a sensor supported by the sensor holder and facing an encoder fixed to the rotary ring to rotate together with the rotary ring;

a harness or connector extended out of the sensor for taking out a detection signal of the sensor; and a sensor unit including the sensor and the harness or connector, wherein:

the sensor is an active sensor; and the harness or connector of the sensor is extended out through an axial groove formed on the knuckle.

According to a fourth aspect of the present invention, there is provided a hub unit for a driving wheel, in which:

one track ring out of a stationary ring and a rotary ring is an outer ring having a plurality of outer ring tracks on the inner peripheral surface thereof;

the other track ring of the stationary ring and the rotary ring is an inner ring assembly comprising a shaft member and an inner ring as a separate body combined with each other and a plurality of inner ring tracks on the outer peripheral surface thereof;

the shaft member is formed with one of the inner ring tracks in a middle part in the axial direction thereof and a small-diameter step portion having a smaller diameter than that of the inner ring track portion at an end portion in the axial direction thereof; and the separate inner ring has the other of the inner ring tracks on the outer peripheral surface thereof and is fitted on the small-diameter step portion, which hub unit comprising:

a sensor holder fixed to the stationary ring of the hub unit for a driving wheel;

a sensor supported by the sensor holder and facing an encoder fixed to the rotary ring to rotate together with the rotary ring;

a harness or connector extended out of the sensor for taking out a detection signal of the sensor; and a sensor unit including the sensor and the harness or connector, wherein:

the sensor is an active sensor.

In the hub unit for a driving wheel according to the fourth aspect of the present invention, it is preferable that the sensor is formed with the sensor holder to be fixed thereto by resin molding as a unitary structure.

In the hub unit for a driving wheel according to the fourth aspect of the present invention, it is preferable that the sensor is press-fitted and fixed to the sensor holder as a unitary structure.

In the hub unit for a driving wheel according to the fourth aspect of the present invention, it is preferable that an outlet hole for discharging water is provided in a lower portion of the sensor holder.

In the hub unit for a driving wheel according to the fourth aspect of the present invention, it is preferable that an IC terminal is bent in the sensor.

In the hub unit for a driving wheel according to the fourth aspect of the present invention, it is preferable that the sensor and the sensor holder can be brought into ratchet fitting to be fixed to each other.

As described above, according to the present invention, the sensor is an active sensor employing, for example, a Hall element or an MR element, and the sensing portion of the sensor directly faces the encoder without interposition between it and the encoder. Since the harness or connector of the sensor is extended out of the gap between the knuckle and the constant velocity universal joint, there is no need to form a hole on the knuckle, unlike in a conventional hub unit, so that the strength of the knuckle is increased, compared with that of a conventional hub unit, which resultantly contributes to a weight reduction and space saving of the knuckle, and makes it easy to assemble a bearing.

According to one aspect of the present invention, the internal circuit of the sensor is disposed circumferentially or in an arc inside a cap, which resultantly contributes to reduce the size and weight of the knuckle and also to increase the strength of the knuckle. It is also possible to effectively use an empty space on the circumference, which can resultantly contribute to size reduction of the hub unit incorporating the sensor.

Further, according to another aspect of the present invention, the harness or connector for taking out a detection signal of the sensor is extended out through the axial groove formed on the knuckle, which can resultantly contribute to reduce the size and the weight of the knuckle and also to increase the strength of the knuckle.

Further, according to still another aspect of the present invention, since it is preferable that the sensor is fixed to the sensor holder as a unitary structure by resin molding or pressure-fitting, the shapes of the sensor and the sensor holder can be simplified and, further, the fixing performance of the sensor and the sensor holder can be improved.

Further, according to still another aspect of the present invention, since the outlet hole for discharging water is preferably formed in a lower portion of the sensor holder, water does not gather between the sensor holder and the bearing so as to maintain the sealing performance satisfactorily.

Further, according to still another aspect of the present invention, since an IC terminal is preferably bent inside the sensor, the length of the whole sensor in the radial direction can be reduced to make the sensor compact and, at the same time, the manufacturing cost can be saved.

Further, according to still another aspect of the present invention, it is preferable that the sensor and the sensor holder should be brought into ratchet fitting to each other to be fixed, whereby the sensor holder can be formed in a simpler form. Further, since the elasticity is not used as the principal retaining force, the retaining force is not deteriorated, and the fixing performance between the sensor and the sensor holder may be enhanced.

BRIEF DESCRIPTION OF THE DRAWINGS

FIG. 9A is a sectional view of an essential part of a hub unit for a driving wheel according to a fourth embodiment of the present invention, and FIG. 9B and FIG. 9C are side views of a sensor for detecting a speed of rotation and a sensor holder, respectively;

MOST PREFERRED EMBODIMENTS OF THE INVENTION

A hub unit for a driving wheel according to an embodiment of the present invention will be described below with reference to drawings.

(Whole Structure of a Hub Unit for a Driving Wheel)

Figure 1:
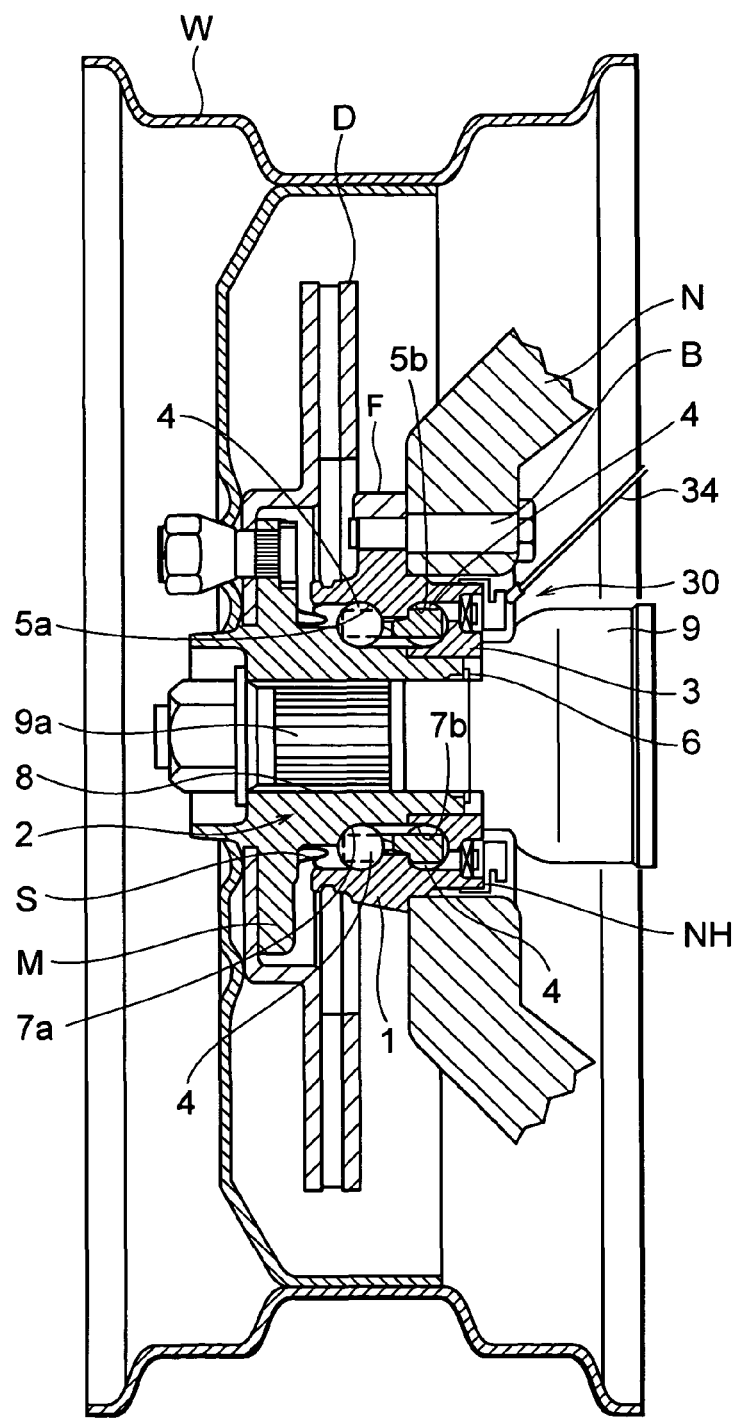
FIG. 1 is a longitudinal sectional view of a hub unit for a driving wheel according to an embodiment of the present invention.

FIG. 1 is a longitudinal sectional view of a hub unit for a driving wheel according to an embodiment of the present invention.

In the hub unit for a driving wheel, a hub 2 for a driving wheel and an inner ring 3 are rotatably supported on the inner diameter side of an outer ring 1 through a plurality of rolling elements 4.

The outer ring 1 is fixedly connected to a knuckle N for forming a suspension system by means of a bolt B through a supporting flange F which is provided on the outer peripheral portion of the outer ring. A portion of the outer ring 1 is, as shown in FIG. 1, inserted in a hub unit mounting hole NH of the knuckle.

A plurality of outer ring tracks 5a, 5b are provided on the inner peripheral surface of the outer ring 1, and the hub 2 for a driving wheel and the inner ring 3 are supported on the inner diameter side of the outer ring 1.

The hub 2 for a driving wheel is provided with a mounting flange M for mounting a wheel W and a brake disc D onto the outer periphery of an outer end portion which is positioned on the outer side of the car body (on the left side in the drawing) at mounted.

A first inner ring track 7a is formed in a middle part of the outer peripheral surface of the hub 2 for a driving wheel, an inner ring 3 is fixedly fitted on a small-diameter step portion 6 formed to be cylindrical in an inner end portion of the same hub 2, and a second inner ring track 7b is formed on the inner ring 3.

A female spline 8 is formed on the inner peripheral surface in the radial direction of the hub 2 for a driving wheel, and a male spline shaft 9a of a constant velocity universal joint 9 is brought into spline-fitting with the female spline 8 to be fixed there.

A seal member S is interposed between the outer peripheral surface of the hub 2 and the outer end portion of the outer ring 1.

First Embodiment

Figure 2:
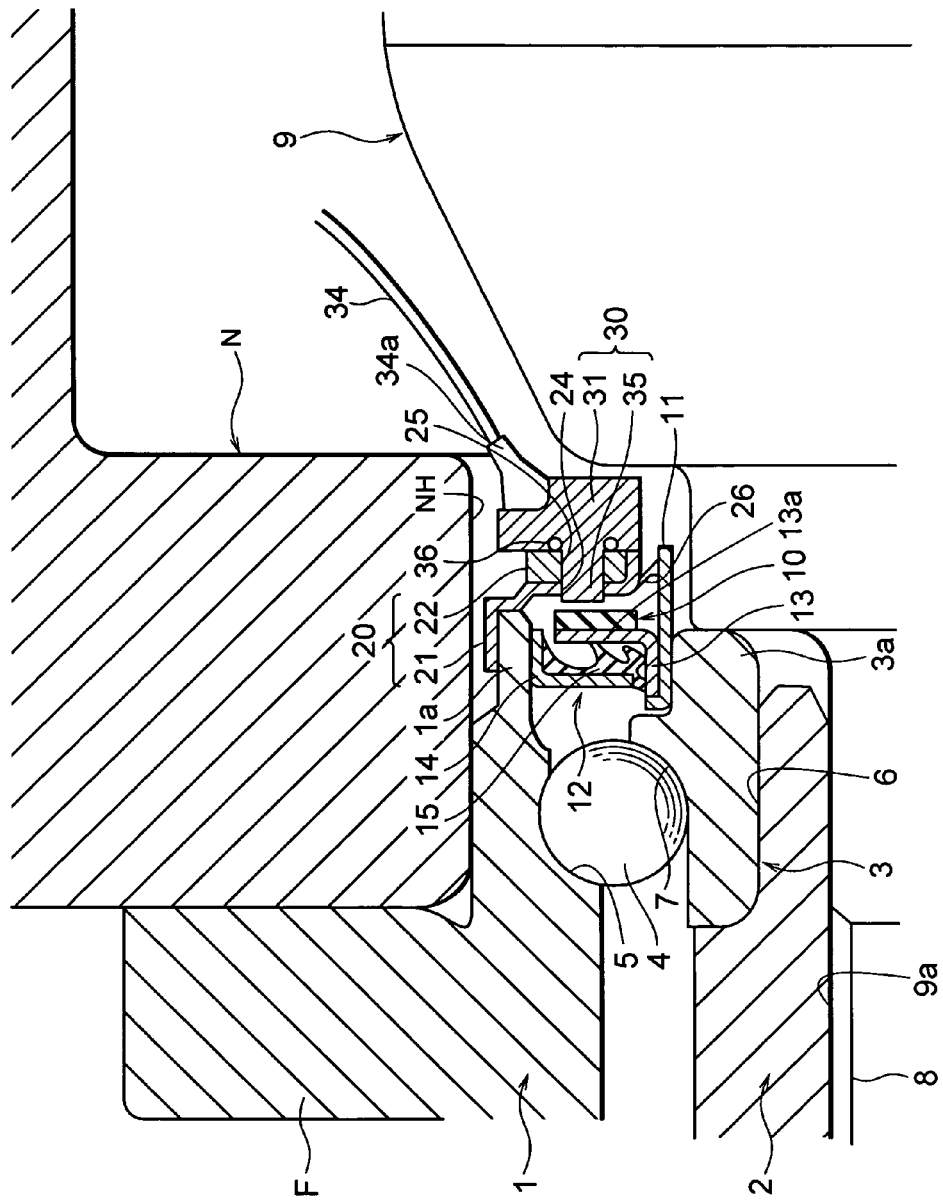
FIG. 2 is a sectional view of an essential part of the hub unit for a driving wheel according to a first embodiment of the present invention shown in FIG. 1.
Figure 3:
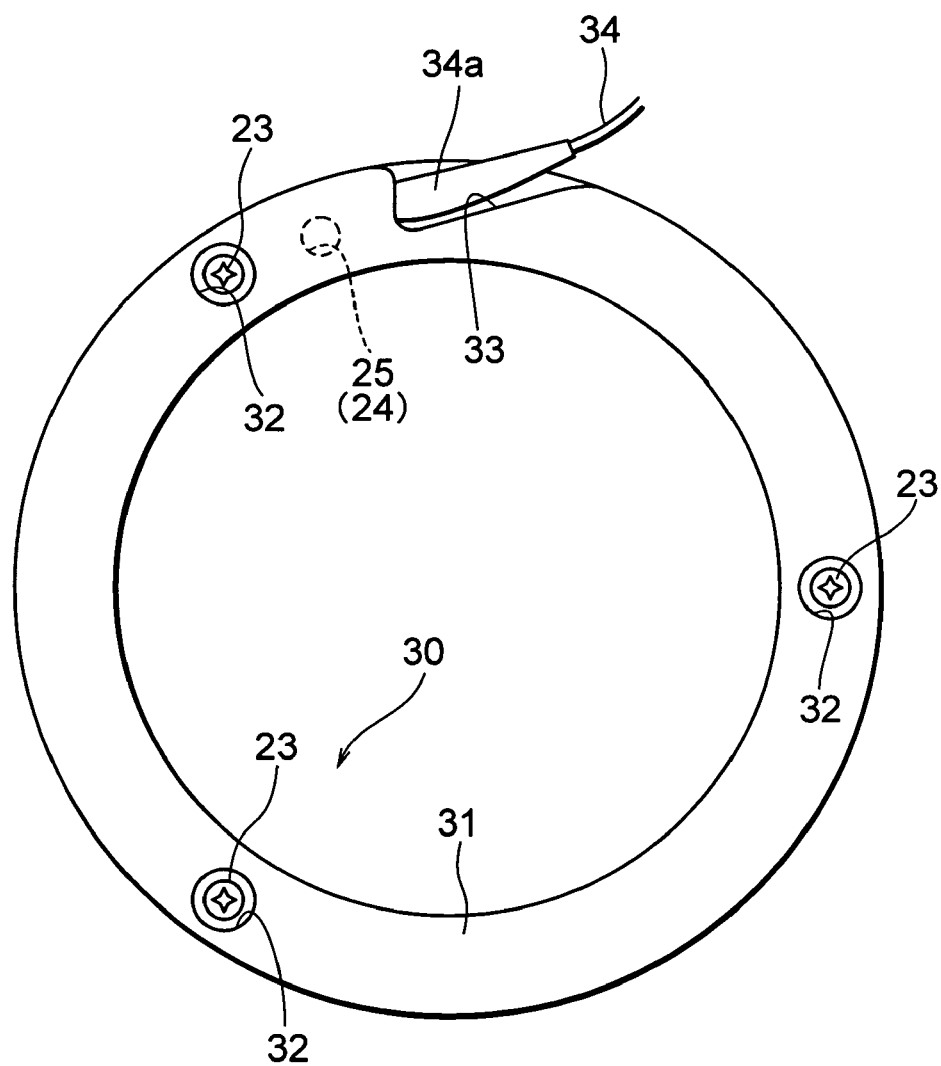
FIG. 3 is a side view of a sensor for detecting a speed of rotation shown in FIG. 2.

FIG. 2 is an enlarged sectional view showing an essential part of the hub unit for a driving wheel according to the first embodiment of the present invention and shown in FIG. 1. FIG. 3 is a side view of a sensor for detecting a speed of rotation shown in FIG. 2.

In the first embodiment, on the inner side in the car width direction of the inner ring 3 (on the right side in FIG. 2), there is provided a magnetic encoder 10. This magnetic encoder 10 is formed to be disc-like, and is alternately magnetized to have a plurality of north poles and south poles in the circumferential direction thereof.

Note that the magnetic encoder can be formed of rubber, resin, or the like.

The magnetic encoder 10 is attached to a cylindrical member 11 which is fixed to an inner end portion 3a of the inner ring 3 in the car width direction through a seal member 12.

The seal member 12 comprises a cylindrical core metal member 13 which is secured to the cylindrical member 11 on the side of the inner ring 2 and has a cross section substantially in an L shape, a cylindrical core metal member 14 which is secured to the inner peripheral surface of the inner end portion 1a in the car width direction of the outer ring 1 and has a cross section substantially in an L shape, and a lip member 15 bonded to the core metal member 14 to perform a sealing function with the core metal member 13.

These core metal members are formed of low-carbon steel plate such as SPCC and the surfaces of these core metal members have been subjected to anticorrosion coating. Alternatively, the core metal members are formed of stainless steel such as SUS430, and the thickness thereof is around 0.1 mm to 1.5 mm.

The magnetic encoder 10 is secured to a surface on the inner side of the car of an annular plate member 13a extended outwardly in the radial direction of the core metal member 13, and a sensor 30 for detecting a speed of rotation serving as an active sensor for detecting a speed of rotation of the driving wheel is provided to face the magnetic encoder 10.

Roughly speaking, this sensor 30 for detecting a speed of rotation is attached to the outer ring 1 through a sensor holder 20, and is positioned on the inner side of the hub unit mounting hole NH of the knuckle N in the radial direction so as not to interfere with the constant velocity universal joint 9.

The sensor 30 for detecting a speed of rotation is fixed to the outer ring 1, and is positioned on the inner side of the hub unit mounting hole NH of the knuckle N in the radial direction. However, this sensor 30 is not brought into contact with the knuckle N and is not subjected to a special treatment for mounting or for preventing interference.

The sensor holder 20 comprises a core metal member 21 which is press-fitted on the outer peripheral surface of an inner end portion 1a of the outer ring 1 in the car width direction and a resin portion 22 formed integrally with an annular plate portion extended inwardly in the radial direction of this core metal member 21.

The sensor 30 for detecting a speed of rotation has, as shown in FIG. 3, a sensor main body 31 which is formed to be annular. This sensor main body 31 has a comparatively great capacity for accommodating the respective constituent elements of the sensor, so that no problem will arise if the number of these constituent elements is great.

As shown in FIG. 3, the main body 31 is engaged with the resin portion 22 of the sensor holder 20 by being fixed thereto with a plurality of screws 23 (three screws in the illustrated embodiment) to be retained thereon. Engagement means of this sensor main body 31 with respect to the sensor holder 20 is not limited to screw-fixing, but may be of any type including, for example, a clip type or a press-fitting type as in embodiments to be described later. The engagement means may be fixed by integrally molding with the resin.

The sensor main body 31 is formed with a concaved hole 32 for receiving the head of the screw 13, in order to prevent the head of the screw 23 from interfering with the constant velocity universal joint 9.

As shown in FIG. 3, the sensor main body 31 is formed with a cut-away portion 33 from which a connecting portion 34a of a harness 34 (code or connector) for taking a detection signal from the sensor is drawn to be extended.

The harness 34 (extending code) may be extended from the sensor main body 31. However, instead of this, it is arranged such that an unrepresented connector is to be extended.

The connection portion 34a of the harness 34 (code or connector) is formed of such a material like resin or vinyl as having deformability for allowing deformation of the shape thereof when a load exceeding a predetermined level is applied externally and a shape retaining capacity for retaining and maintaining the shape always as it is when the load is not higher than the predetermined level or when no load other than the dead load (which may include the weight of the harness 34 (code or connector)) is applied.

The connection portion 34a of the harness 34 (code or connector) maintains its shape so that it is positioned more on the outer diameter side (in case of being in the same axial directional position) than the outer diameter of the constant velocity universal joint 9 at least until it comes out the hub unit mounting hole NH of the knuckle N when the load is not higher than the predetermined level.

With this arrangement, the connection portion 34a of the harness 34 (code or connector) is positioned on the inner side in the radial direction of the hub unit mounting hole NH of the knuckle N, so as not to interfere with the constant velocity universal joint 9.

As shown in FIG. 2, through-holes 24 and 25 are formed respectively on the core metal member 21 and the resin portion 22 of the sensor holder 20, and a sensing portion 35 extended from the sensor main body 31 is inserted into these through-holes 24 and 25.

This sensing portion 35 is arranged to be exposed from the core metal member 21 outwardly in the car width direction (on the left side in FIG. 2) so as to face the magnetic encoder 10. With this arrangement, when the hub unit is in use, the magnetic encoder 10 which is fixed to the inner ring 3 is rotated upon rotation of the driving wheel, whereby an output of the sensor 30 which is disposed to face the magnetic encoder 10 is changed. Since the frequency of this output change is in proportion to the speed of rotation of the driving wheel, an output signal from the sensor 30 can be supplied to a control apparatus (not shown) so as to obtain the speed of rotation of the driving wheel, whereby the ABS or the TCS can be appropriately controlled.

It is possible to provide a plurality of sensing portions 35, or to attach a plurality of Hall ICs to a single sensing portion. Reference numeral 26 denotes a seal lip or seal member which is secured to the cylindrical member 11, so as to airtightly seal a space formed between the cylindrical member 11 and the core metal member 21 of the sensor holder 20, in order to protect the sensing portion 35 and the like. This portion may be a labyrinth seal. In case of a labyrinth seal, there is a fear that rainwater or the like may enter the vicinity of the sensing portion 35, so that an outlet hole for discharging rainwater and the like is preferably formed in a lower portion of the core metal member 21 of the sensor holder 20, as in other embodiments which will be described later. A reference numeral 36 denotes an O ring for preventing water from entering the sensing portion 35 by sealing a space between the resin portion 22 and the sensor main body 31.

As described above, according to the first embodiment, the sensor 30 for detecting a speed of rotation is attached to the outer ring 1 through the sensor holder 20, and is positioned on the inner side in the radial direction of the hub unit mounting hole NH of the knuckle N so as not to interfere with the constant velocity universal joint 9. When the load is not more than a predetermined value, the connecting part 34a of the harness 34 (code or connector) maintains its shape so as to be disposed more on the outer diameter side than the outer diameter of the constant velocity universal joint 9 at least until it comes out the mounting hole NH of the knuckle H. Note that, though the sensor 30 for detecting a speed of rotation is arranged to be positioned on the inner side in the radial direction of the hub unit mounting hole NH of the knuckle N, the positional relationship between the hub unit mounting hole NH and the sensor 30 is not limited to that shown in FIG. 2, but they may be deviant wholly or partially in the axial direction.

Also, according to the present embodiment, the sensor 30 for detecting a speed of rotation is an active sensor constituted by a Hall element or an MR element, the sensing portion 35 thereof is disposed to directly face the magnetic encoder 10 without interposition between it and the magnetic encoder 10, and the harness 34 (code or connector) of the sensor 30 for detecting a speed of rotation is extended out of a space between the knuckle N and the constant velocity universal joint 9, so that there is no need to form a hole on the knuckle N and the strength of the knuckle N is enhanced, compared with that of the prior art, which can resultantly contribute to weight reduction and space saving of the knuckle N. In addition, it becomes easier to assemble the bearing.

(Variation of the First Embodiment)

Figure 4:
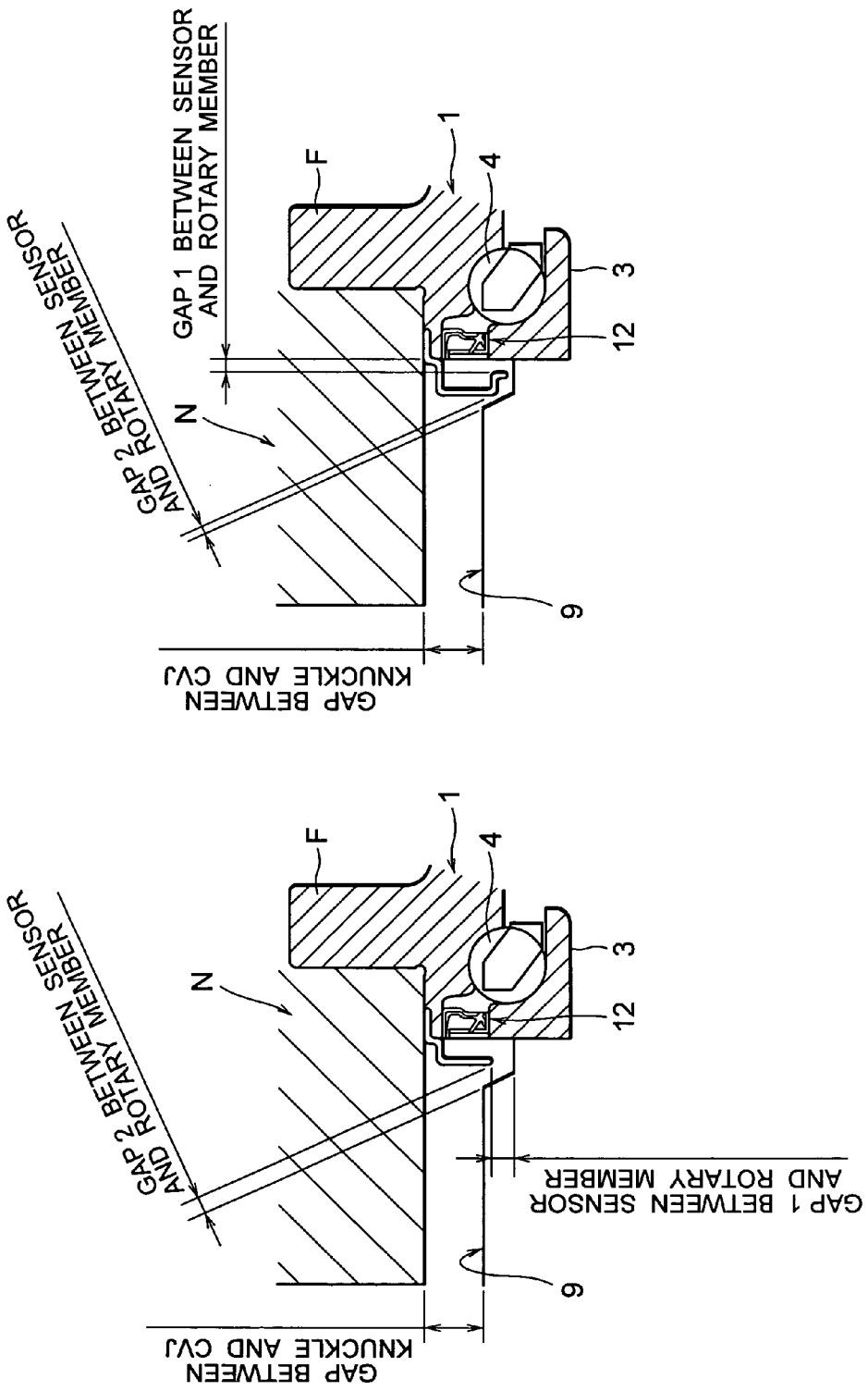
FIG. 4A and FIG. 4B are schematic sectional views respectively showing a hub unit for a driving wheel according to a variation of the first embodiment of the present invention.

FIG. 4A and FIG. 4B are schematic sectional views respectively showing a hub unit for a driving wheel according to a variation of the first embodiment of the present invention.

Preferably, a gap between the sensor main body 31 (cap) of the sensor 30 for detecting a speed of rotation and a rotary member constituted by at least an end surface of the inner ring 3, the outer diameter thereof and the constant velocity universal joint (CVJ) 9 is set to be of not less than 0.1 mm and to be smaller than a gap between the constant velocity universal joint 9 and the knuckle N.

That is, as shown in FIGS. 4A and 4B, the gap (1) or (2) between the sensor 30 for detecting a speed of rotation and the rotary member is set to be of not less than 0.1 mm and to be smaller than a gap between the constant velocity universal joint 9 and the knuckle N. With this arrangement, the space between the sensor 30 for detecting a speed of rotation and the rotary member is arranged to have a labyrinth structure.

The ground of setting said "0.1 mm" is that this is the minimum gap when taking the interference between the constant velocity universal joint 9 and the rotary member due to a displacement caused by level oscillation and elastic deformation of the bearing into consideration.

Second Embodiment

Figure 5:
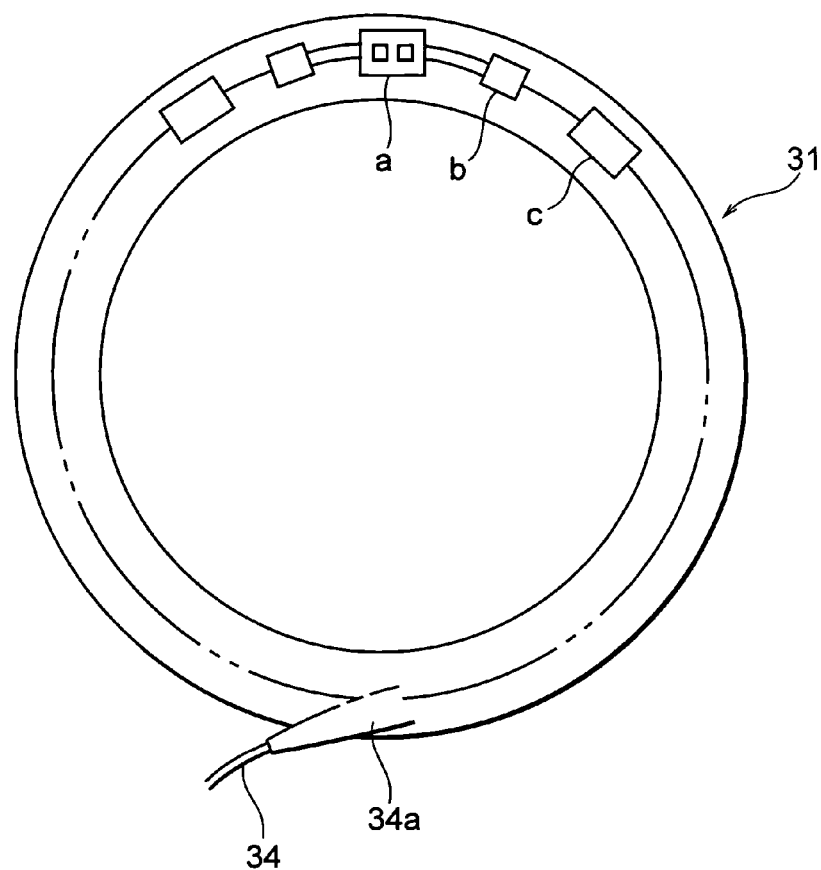
FIG. 5 is a schematic view showing an internal structure of a sensor for detecting a speed of rotation according to a second embodiment of the present invention.

FIG. 5 is a schematic view showing an internal structure of a sensor for detecting a speed of rotation according to a second embodiment of the present invention.

In the second embodiment, the electronic components a, b, c, . . . , of the sensor accommodated in the sensor main body 31 (cap) formed circumferentially are disposed along the circumferential form of this cap. In addition, these electronic components a, b, c, . . . , are connected to the harness 34 (code or connector).

As described above, according to the present embodiment, the internal circuit of the sensor 30 for detecting a speed of rotation is disposed circumferentially in the sensor main body 31 (cap), which resultantly contributes to reduce the size and the weight of the knuckle N and also to enhance the strength thereof. It is also possible to effectively utilize a vacant space on the circumference, which can contribute to reduce the size of the hub unit incorporated in the sensor.

(Variation of the Second Embodiment)

Figure 6:
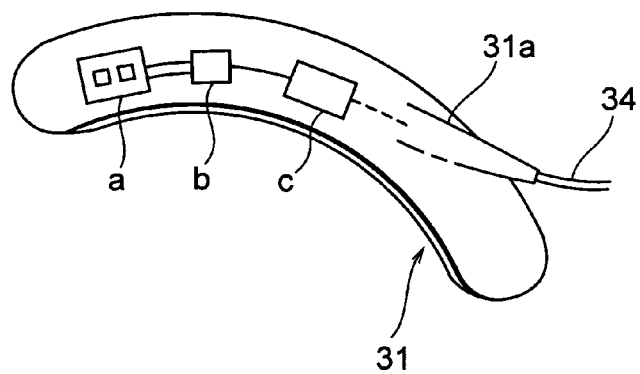
FIG. 6 is a schematic view showing an internal structure of a sensor for detecting a speed of rotation according to a variation of the second embodiment of the present invention.

FIG. 6 is a schematic view showing an internal structure of a sensor for detecting a speed of rotation according to a variation of the second embodiment of the present invention.

In this variation, the sensor main body 31 (cap) takes an arc-like form and the electronic components a, b, c, . . . , of the sensor accommodated in the sensor main body 31 (cap) having this arc-like form are disposed along the arc form of this cap. In addition, these electronic components a, b, c, . . . , are connected to the harness 34 (code or connector).

As described above, according to this variation, the internal circuit of the sensor 30 for detecting a speed of rotation is disposed in an arc in the sensor main body 31 (cap), which resultantly contributes to reduce the size and the weight of the knuckle N and also to enhance the strength thereof. It is also possible to effectively utilize a vacant space on the circumference, which can contribute to reduce the size of the hub unit incorporated in the sensor.

Third Embodiment

Figure 7:
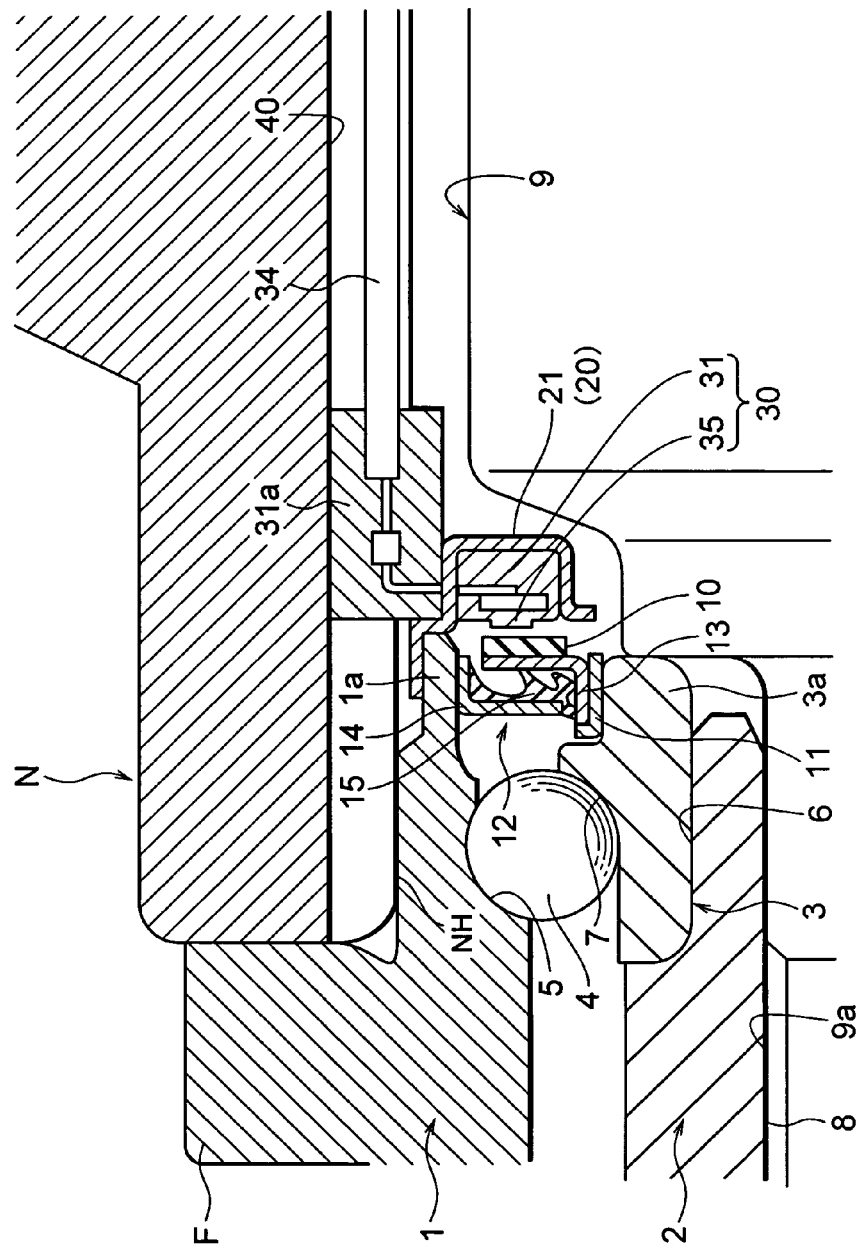
FIG. 7 is a sectional view of an essential part of the hub unit for a driving wheel according to a third embodiment of the present invention.
Figure 8:
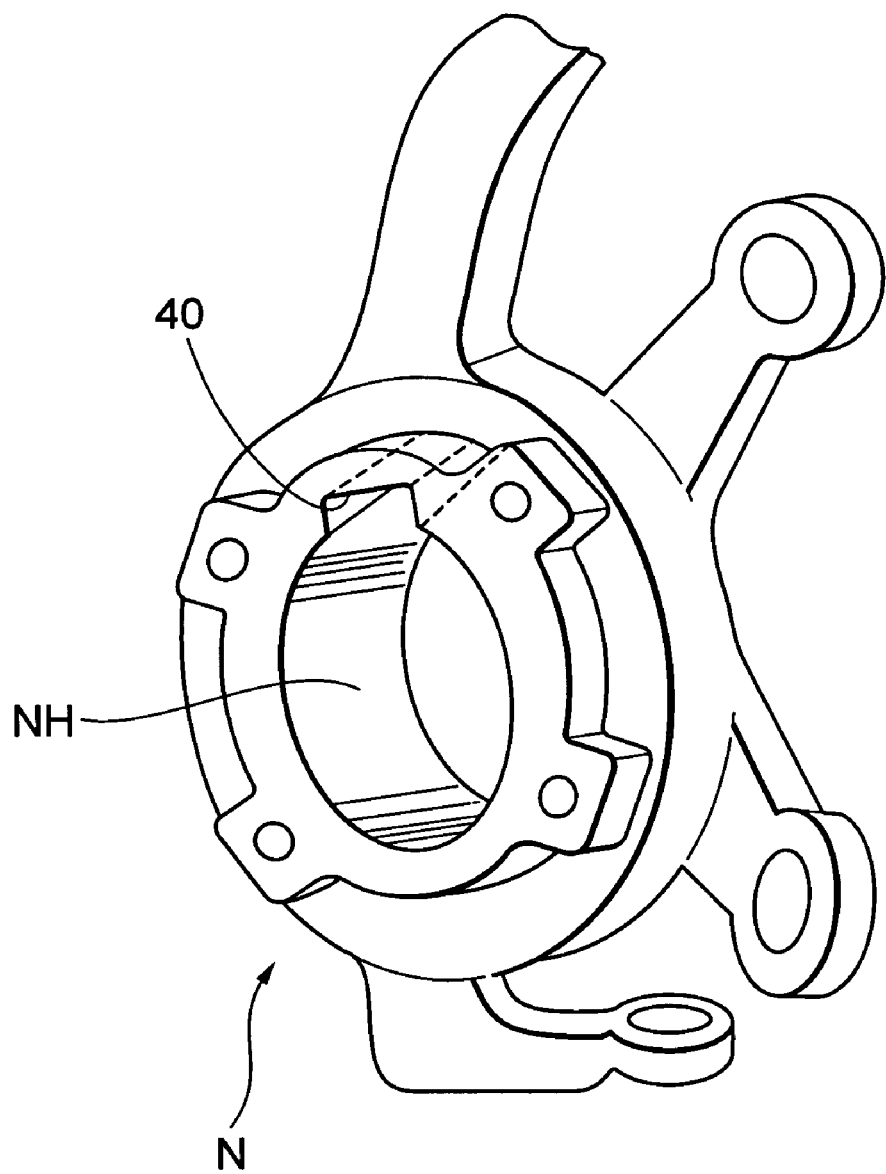
FIG. 8 is a perspective view of a knuckle shown in FIG. 7.

FIG. 7 is a sectional view of an essential part of the hub unit for a driving wheel according to a third embodiment of the present invention, and FIG. 8 is a perspective view of the knuckle shown in FIG. 7.

The basic structure of the third embodiment is substantially the same as that of the foregoing first embodiment, so that only different points will be described.

The sensor holder 20 is constituted only by the core metal member 21, and this core metal member 21 is constituted by a cylindrical portion which is fixedly fitted on an inner end portion 1a of the outer ring 1 in the car width direction and a portion with a substantially U-shaped section which is extended inwardly in the radial direction from the inner end of the cylindrical portion to surround and retain the sensor main body 31 of the sensor 30 for detecting a speed of rotation from the inner side in the car width direction.

The hub unit mounting hole NH of the knuckle N is formed with an axial groove 40 which is extended in the axial direction.

The sensor 30 for detecting a speed of rotation has a sub-body 31a, in addition to the sensor main body 31 and the sensing portion 35, and this sub-body 31a is accommodated in the axial groove 40 of the knuckle N and is supported by the core metal member 21.

The harness 34 (code or connector) is extended out of the sub-body 31a inwardly in the car width direction, to be elongated inwardly in the car width direction inside the axial groove 40.

As described above, according to the present embodiment, since the harness 34 (code or connector) of the sensor 30 for detecting a speed of rotation is taken out through the axial groove 40 which is formed on the knuckle N, it is possible to reduce the size and the weight of the knuckle N and to enhance the strength thereof.

Fourth Embodiment

FIG. 9A is a sectional view of an essential part of a hub unit for a driving wheel according to a fourth embodiment of the present invention, and FIG. 9B and FIG. 9C are side views of a sensor for detecting a speed of rotation and a sensor holder, respectively.

The basic structure of the fourth embodiment is substantially the same as that of the first or third embodiment described above, so that only different points will be described.

The sensor holder 20 is constituted only by the core metal member 21 (cover), and this core metal member 21 is secured to an inner end portion 1a of the outer ring 1 in the car width direction at the base end thereof, and is formed with a portion 21a with a substantially U-shaped section which is extended in the axial direction and inwardly in the radial direction from the base end. It is arranged such that the sensor main body 31 of the sensor 30 for detecting a speed of rotation is surround by the portion 21a with a substantially U-shaped section from an inner side in the car width direction.

That is, the sensor main body 31 is integrally formed securely with the portion 21a with a substantially U-shaped section of the core metal member 21 (cover) by resin molding.

In this case, the sensor main body 31 is formed to be annular (in a doughnut-like form), as shown in FIG. 9B, or, instead of this, to be arc-like (fan-like), as shown in FIG. 9C.

Note that as the related prior art, in the above-described Japanese Patent Laid-Open Application Nos. 2000-22202, 2000-221203 and 2000-221204, there is disclosed a sensor for detecting a speed of rotation which is latched by or thread-engaged with a sensor holder to be fixed on a non-rotating side. In this case, however, the sensor for detecting a speed of rotation and the sensor holder may have complicated configurations, and further a fixing performance between the sensor for detecting a speed of rotation and the sensor holder may not be always sufficient.

From the above description, in the present embodiment, the sensor main body 31 is integrally formed with the portion 21a with a substantially U-shaped section by resin molding, so that it is possible to simplify the configurations of the sensor 30 for detecting a speed of rotation and the sensor holder 20. Further, it is possible to improve the fixing performance between the sensor 30 for detecting a speed of rotation and the sensor holder 20.

Also, in the present embodiment, it is arranged such that the gap between the sensor main body 31 (cap) of the sensor 30 for detecting a speed of rotation and the rotary member constituted by at least an end surface of the inner ring 3, the outer diameter thereof, and the constant velocity universal joint 9 is set to be not less than 0.1 mm and to be smaller than the gap between the constant velocity universal joint 9 and the knuckle N. That is, as shown in FIGS. 4A and 4B, the gaps (1) and (2) between the sensor 30 for detecting a speed of rotation and the rotary member are respectively set to be not less than 0.1 mm and to be smaller than the gap between the constant velocity universal joint 9 and the knuckle N. With this arrangement, the space between the sensor 30 for detecting a speed of rotation and the rotary member is arranged to have a labyrinth structure. Note that the ground of setting the "0.1 mm" described above is that this is the minimum gap when taking the interference between the constant velocity universal joint 9 and the rotary member due to a displacement caused by level oscillation and elastic deformation of the bearing into consideration.

Fifth Embodiment

Figure 10B:
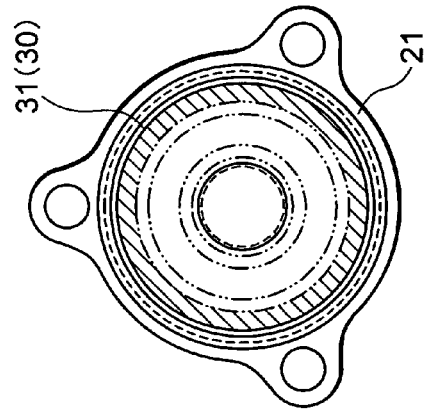
FIG. 10B and FIG. 10C are side views of a sensor for detecting a speed of rotation and a sensor holder, respectively.
Figure 10C:
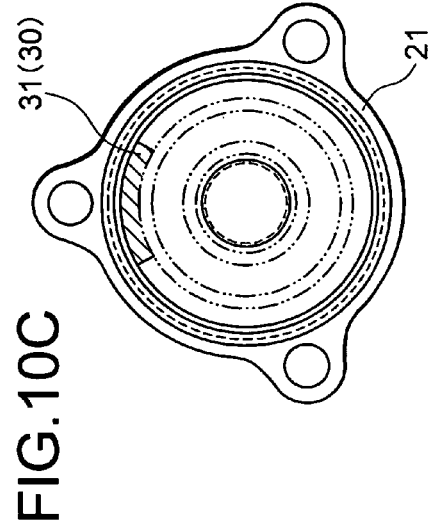
Figure 10A:
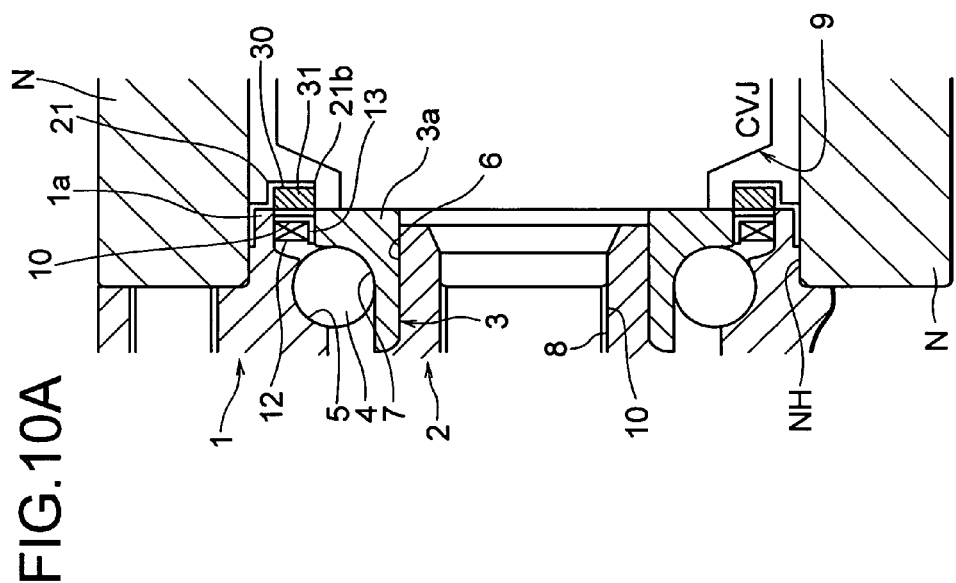
FIG. 10A is a sectional view of an essential part of a hub unit for a driving wheel according to a fifth embodiment of the present invention.

FIG. 10A is a sectional view of an essential part of a hub unit for a driving wheel according to a fifth embodiment of the present invention, and FIG. 10B and FIG. 10C are side views of a sensor for detecting a speed of rotation and a sensor holder, respectively.

The basic structure of this fifth embodiment is substantially the same as that of the first, third or fourth embodiment described above, so that only different points will be described.

The sensor holder 20 is constituted only by the core metal member 21 (cover), and this core metal member 21 is secured to an inner end portion 1a of the outer ring 1 in the car width direction at the base end thereof, and is formed with a portion 21b with a substantially U-shaped section which is extended in the radial direction and inwardly in the axial direction from this base end. It is arranged such that the sensor main body 31 of the sensor 30 for detecting a speed of rotation is surround by this portion 21b with a substantially L-shaped section from an inner side in the car width direction.

That is, the sensor main body 31 is integrally press-fitted to be fixed on the portion 21b with the substantially L-shaped section of the core metal member 21 (cover).

In this case, the sensor main body 31 is formed to be annular (in a doughnut-like form), as shown in FIG. 10B, or, instead of this, to be arc-like (fan-like), as shown in FIG. 10C.

Note that as the related prior art, in the above-described Japanese Patent Laid-Open Application Nos. 2000-22102, 2000-221203 and 2000-221204, there is disclosed a sensor for detecting a speed of rotation which is latched by or thread-engaged with a sensor holder to be fixed on a non-rotating side. In this case, however, the sensor for detecting a speed of rotation and the sensor holder may have complicated configurations, and further a fixing performance between the sensor for detecting a speed of rotation and the sensor holder may not be always sufficient.

From the above description, in the present embodiment, the sensor main body 31 is integrally press-fitted on the portion 21b with a substantially L-shaped section to be fixed there, so that it is possible to simplify the configurations of the sensor 30 for detecting a speed of rotation and the sensor holder 20. Further, it is possible to improve the fixing performance between the sensor 30 for detecting a speed of rotation and the sensor holder 20 since the contact area between the sensor main body 31 and the core metal member 21 (cover) is conspicuously enlarged.

Figure 11:
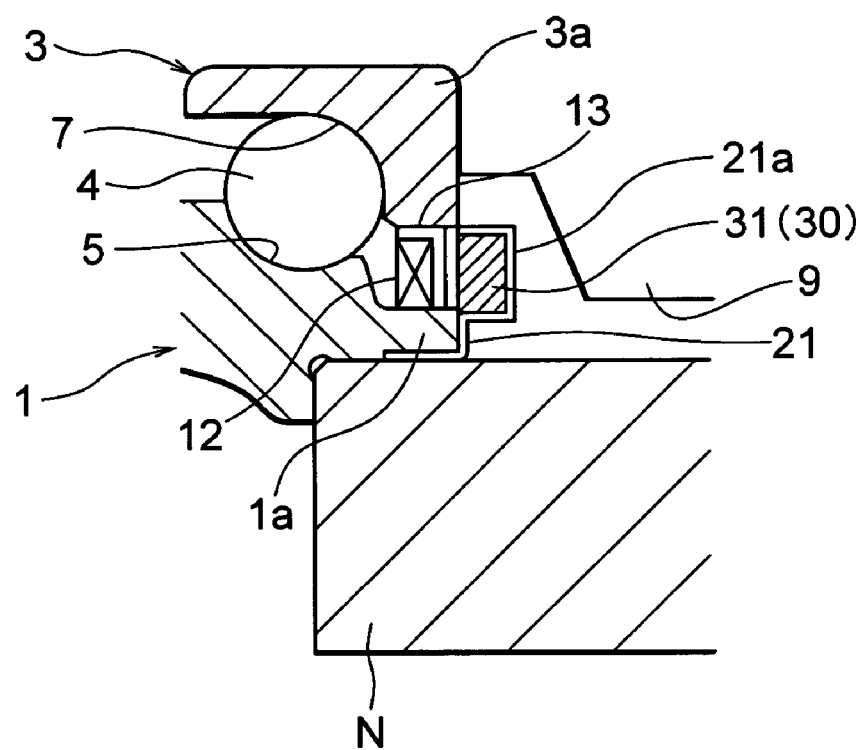
FIG. 11 is a sectional view of an essential part of a hub unit for a driving wheel according to a variation of the fifth embodiment of the present invention.

FIG. 11 is a sectional view of an essential part of a hub unit for a driving wheel according to a variation of the fifth embodiment of the present invention.

In this variation, the sensor holder 20 is constituted only by the core metal member 21 (cover), and this core metal member 21 is secured to an inner end portion 1a of the outer ring 1 in the car width direction at the base end thereof, and is formed with a portion 21a with a substantially U-shaped section which is extended inwardly in the axial direction and inwardly in the radial direction from this base end. Then, the sensor main body 31 is integrally press-fitted to be fixed on this portion 21a with a substantially U-shaped section.

That is, a portion on the inner diameter side of the core member 21 (cover) is bent, and the sensor main body 31 is integrally press-fitted to be fixed on this bent portion 21a with a substantially U-shaped section.

Sixth Embodiment

Figure 12:
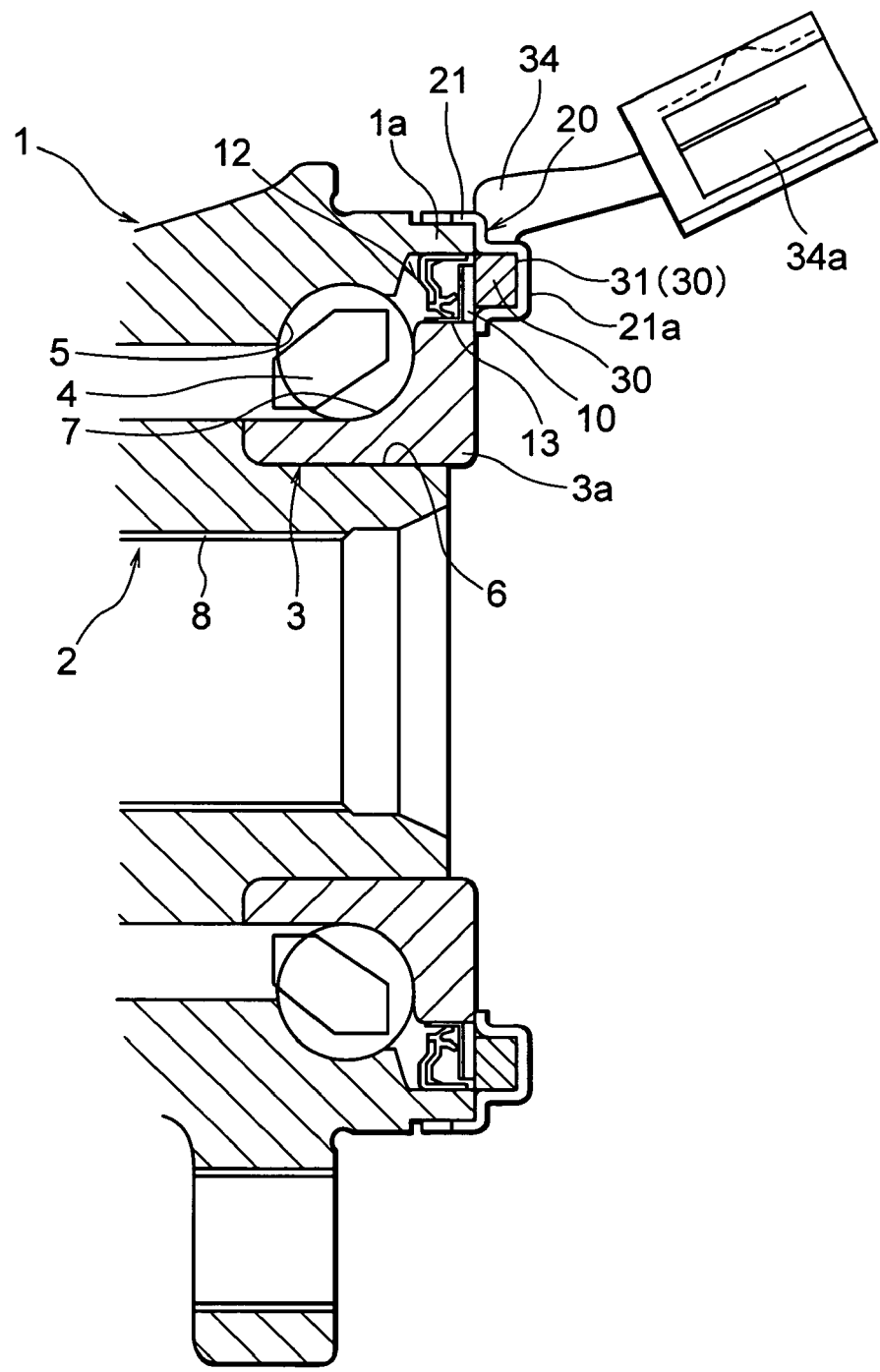
FIG. 12 is a sectional view of an essential part of a hub unit for a driving wheel according to a sixth embodiment of the present invention.

FIG. 12 is a sectional view of an essential part of a hub unit for a driving wheel according to a sixth embodiment of the present invention.

Figure 13:
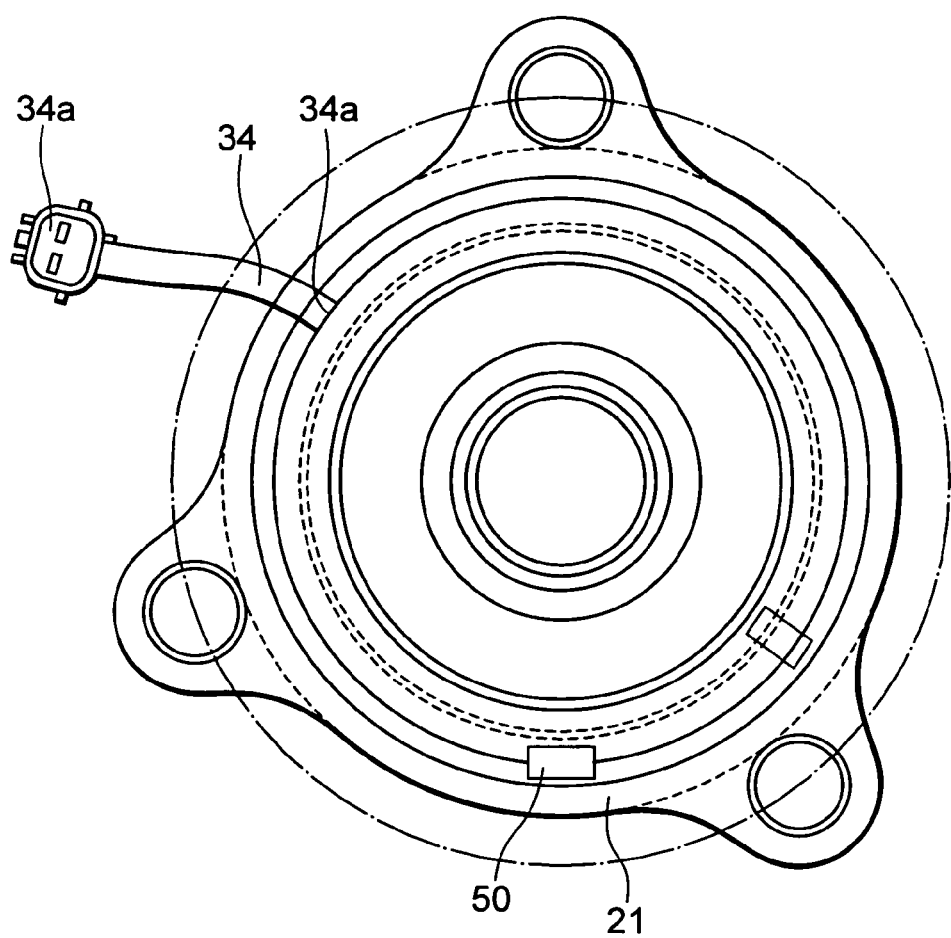
FIG. 13 is a side view of the sensor for detecting a speed of rotation and the sensor holder.

FIG. 13 is a side view of the sensor for detecting a speed of rotation and the sensor holder.

The basic structure of this sixth embodiment is substantially the same as that of the first to third embodiments described above, so that only different points will be described.

As shown in FIG. 12, the sensor holder 20 is constituted only by the core metal member 21 (cover), and this core metal member 21 is secured to an inner end portion 1a of the outer ring 1 in the car width direction at the base end thereof, and is formed with a portion 21a with a substantially U-shaped section which is extended inwardly in the axial direction and inwardly in the radial direction from this base end. It is arranged such that the sensor main body 31 of the sensor 30 for detecting a speed of rotation is surround by this portion 21a with a substantially U-shaped section from an inner side in the car width direction. Moreover, a space between the inner diameter side of the core metal member 21 (cover) and the inner end portion 3a of the inner ring 3 in the car width direction is in a labyrinth structure, as in the foregoing embodiment (FIG. 4), and a reference numeral 34a denotes a connector.

The sensor 30 is disposed to directly face the magnetic encoder 10. The magnetic encoder 10 is secured to the core metal 13 which is fixed to the inner ring 3, like in the first embodiment shown in FIG. 2.

Incidentally, according to the prior art, since no outlet hole for discharging water is provided in a lower portion of the core metal member 21 (cover), water does not escape and remains between the core metal member 21 (cover) and the bearing, so as to deteriorate the sealing performance.

In case of the present embodiment, as shown in FIG. 13, an outlet hole 50 for discharging water is provided in a lower portion of the core metal member 21 (cover), whereby water does not remain between the core metal member 21 (cover) and the bearing, so as to maintain the sealing performance satisfactorily.

Seventh Embodiment

Figure 14A:
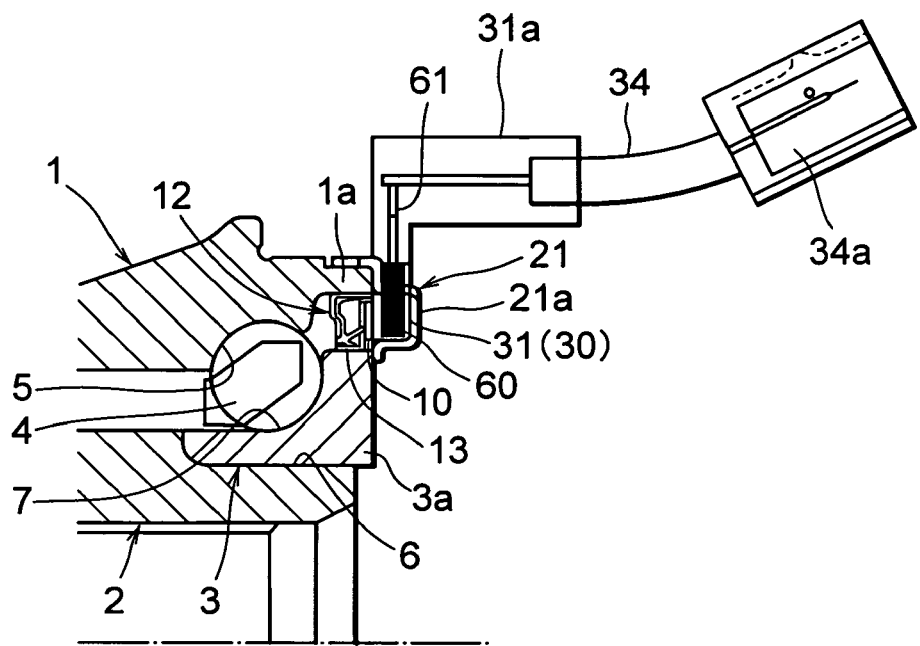
FIGS. 14A and 14B are, respectively, a sectional view of an essential part of a hub unit for a driving wheel and a side view of a sensor for detecting a speed of rotation according to a first conventional example on a seventh embodiment of the present invention.
Figure 14B:
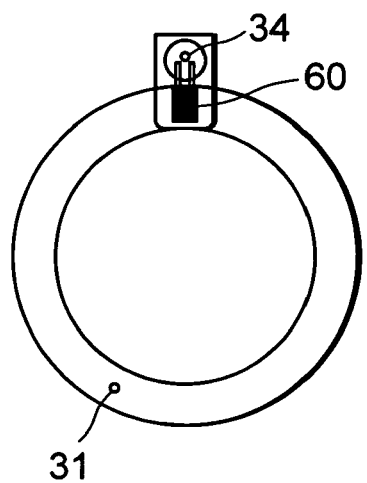

FIG. 14 includes a sectional view of an essential part of a hub unit for a driving wheel and a side view of a sensor for detecting a speed of rotation according to a first conventional example on a seventh embodiment of the present invention.

Figure 15A:
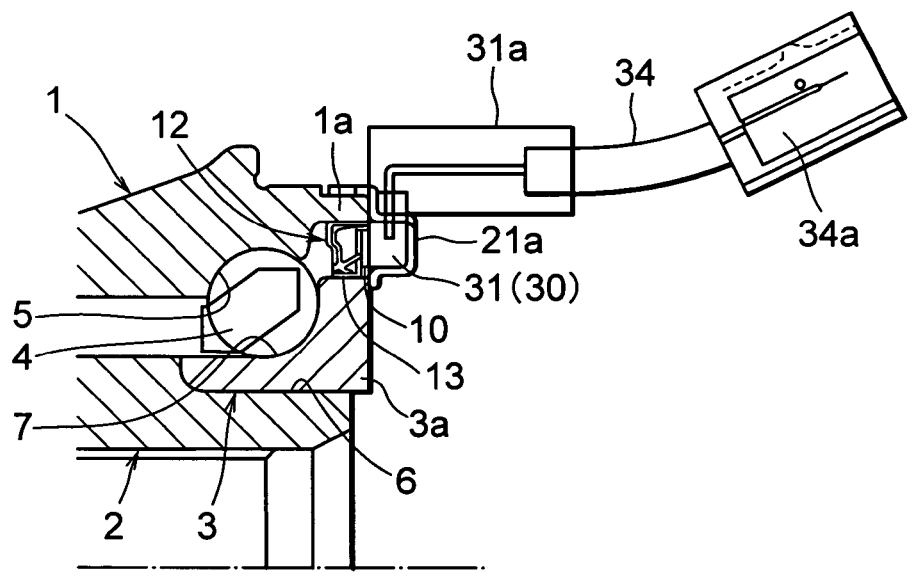
FIGS. 15A and 15B are, respectively, a sectional view of an essential part of a hub unit for a driving wheel and a side view of a sensor for detecting a speed of rotation according to a second conventional example on the seventh embodiment of the present invention.
Figure 15B:
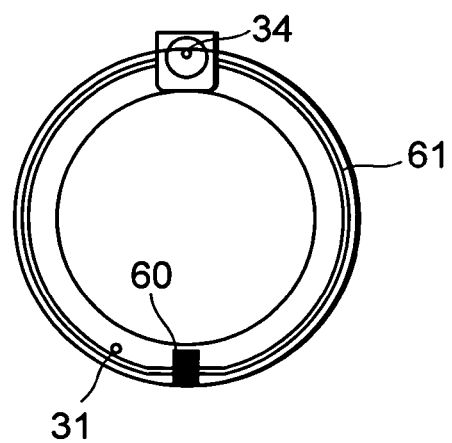

FIG. 15A is a sectional view of an essential part of a hub unit for a driving wheel according to a second conventional example on the seventh embodiment of the present invention, and FIG. 15B is a side view of the sensor for detecting a speed of rotation.

Figure 16A:
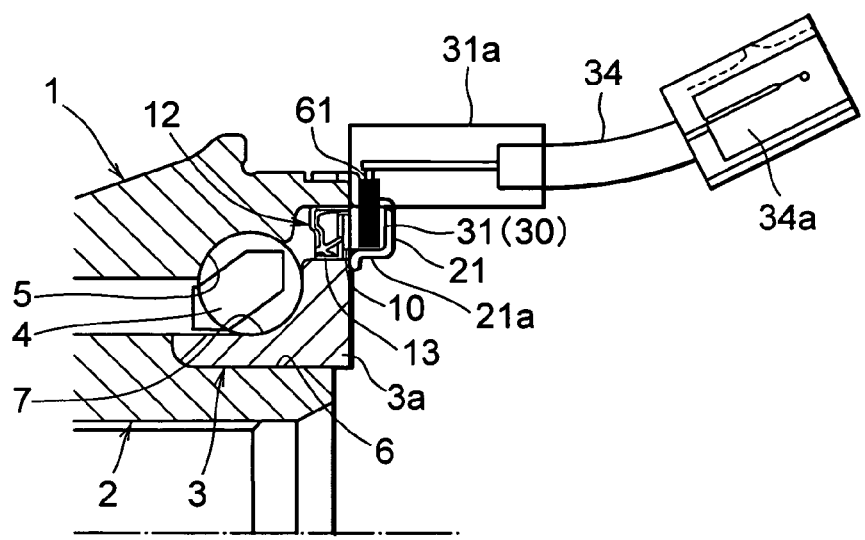
FIGS. 16A and 16B are, respectively, a sectional view of an essential part of a hub unit for a driving wheel and a side view of a sensor for detecting a speed of rotation according to the seventh embodiment of the present invention.
Figure 16B:
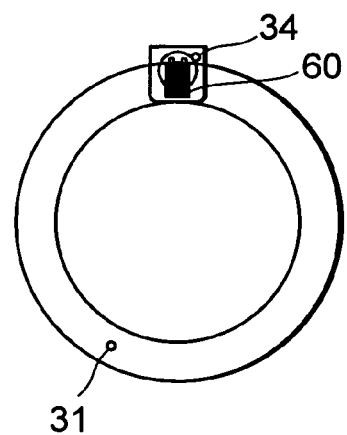

FIG. 16A is a sectional view of an essential part of a hub unit for a driving wheel according to the seventh embodiment of the present invention, and FIG. 16B is a side view of the sensor for detecting a speed of rotation.

The basic structure of this seventh embodiment is substantially the same as that of the first or third embodiment described above, so that only different points will be described.

In the first conventional example shown in FIG. 14, the sensor main body 31 of the sensor 30 for detecting a speed of rotation is provided with an IC 60. An IC terminal 61 is extended from this IC 60 and is connected to the harness 34 inside the sub-body 31a.

As described above, in the first conventional example shown in FIG. 14, since the IC terminal 61 is extended linearly (in a straight line form), an ordinary IC which is distributed in a market can be utilized as it is, which is excellent in cost performance. However, the fact that the IC terminal 61 is extended linearly (in a straight line form) causes a problem that the length of the whole sensor 30 for detecting a speed of rotation in the radial direction is increased.

In the second conventional example shown in FIG. 15, the IC terminal 61 is turned around in a circle inside the sensor main body 31 in a ring shape, whereby it is arranged to reduce the radial length of the whole sensor 30 for detecting a speed of rotation, which, however, may increase the manufacturing cost in the second conventional example shown in FIG. 16.

For these reasons, in the present embodiment shown in FIG. 16, the IC terminal 61 is bent, for example, at about 90 degrees, which can resultantly reduce the radial length of the whole sensor 30 for detecting a speed of rotation and make it compact. At the same time, it is possible to reduce the manufacturing cost.

Eighth Embodiment

Figure 17A:
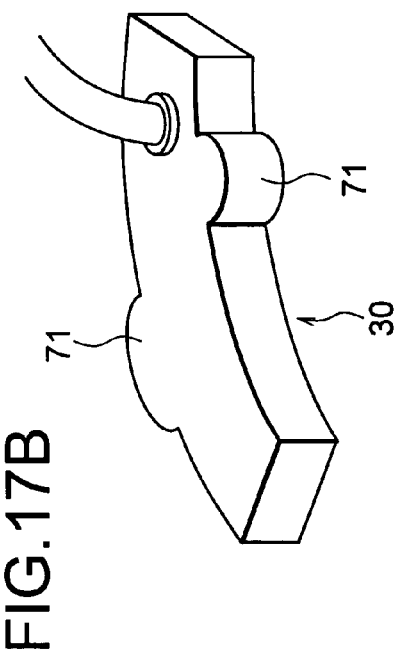
FIG. 17A is a perspective view of a sensor for detecting a speed of rotation and a sensor holder of a hub unit for a driving wheel according to an eighth embodiment of the present invention.

FIG. 17A is a perspective view of a sensor for detecting a speed of rotation and a sensor holder of a hub unit for a driving wheel according to an eighth embodiment of the present invention.

The basic structure of this eighth embodiment is substantially the same as that of the first or third embodiment described above, so that only different points will be described.

Note that as the related prior art, in the above-described Japanese Patent Laid-Open Application Nos. 2000-221202, 2000-221203 and 2000-221204, a sensor for detecting a speed of rotation is latched by or thread-engaged with a sensor holder to be fixed on a non-rotating side. In this case, however, the sensor for detecting a speed of rotation and the sensor holder may have complicated configurations, and further a fixing performance between the sensor for detecting a speed of rotation and the sensor holder may not be always sufficient since only the elasticity of the sensor holder is used as the retaining force.

In the present embodiment shown in FIG. 17A, the sensor 30 for detecting a speed of rotation is formed with a convex portion 71 having a substantially arc-like form, while the sensor holder 20 is formed with a concave portion 72 having a substantially arc-like form. There is formed a peaked recessive part 72a for performing ratchet-fixing adjacent to this concave portion 72.

As a result, when the convex portion 71 of the sensor 30 for detecting a speed of rotation is fitted in the concave portion 72 of the sensor holder 20 and the sensor 30 for detecting a speed of rotation and the sensor holder 20 are rotated relatively to each other, the convex portion 71 is fitted in the peaked recessive part 72a like a ratchet, whereby the convex portion 71 having a substantially arc-like form and the peaked recessive part 72a can be brought into ratchet fitting with each other to be fixed.

As described above, in the present embodiment, since the convex portion 71 having a substantially arc-like shape and the peaked recessive part 72a can be brought into ratchet fitting with each other to be fixed, the sensor holder 21 can have a simplified shape. Further, since the elasticity is not used as a principal retaining force, there is no deterioration in the retaining performance, so that the fixing performance between the sensor 30 for detecting a speed of rotation and the sensor holder 20 can be enhanced.

Figure 17B:
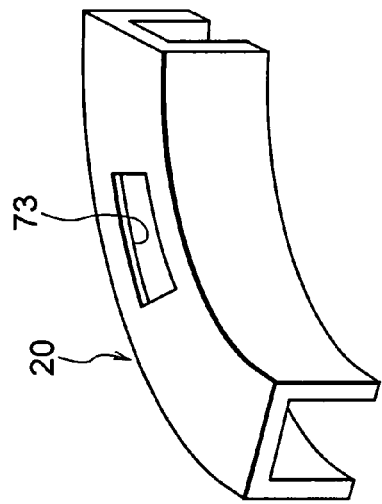
FIG. 17B is a perspective view of a variation of a sensor for detecting a speed of rotation of the hub unit for a driving wheel according to the eighth embodiment of the present invention.

FIG. 17B is a perspective view of a variation of a sensor for detecting a speed of rotation of the hub unit for a driving wheel according to the eighth embodiment of the present invention.

In this variation, the sensor 30 for detecting a speed of rotation is formed with two convex portions 71 each having a substantially arc-like form. With this arrangement, the fixing performance between the sensor 30 for detecting a speed of rotation and the sensor holder 20 can be further enhanced.

Figure 17C:
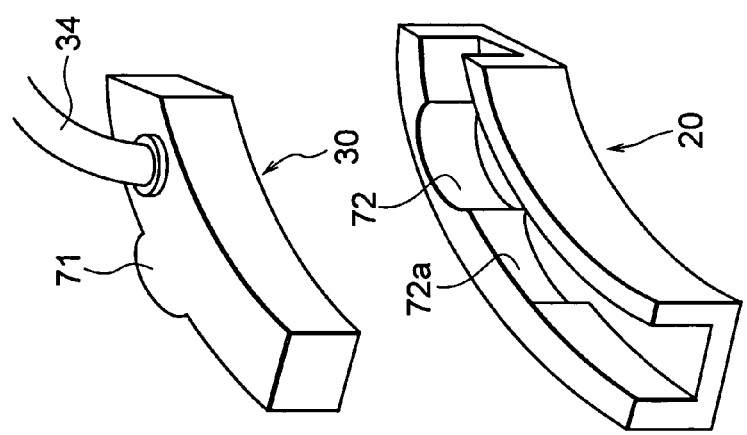
FIG. 17C is a perspective view of a variation of a sensor holder of the hub unit for a driving wheel according to the eighth embodiment of the present invention.

FIG. 17C is a perspective view of a variation of a sensor holder of the hub unit for a driving wheel according to the eighth embodiment of the present invention.

In this variation, the sensor holder 20 is formed with a hole 73 for inserting the sensing portion 35 of the sensor 30 for detecting a speed of rotation therethrough. Note that, it may be arranged to detect a speed of rotation through a non-magnetic material, without providing such a hole 73.

Figure 18:
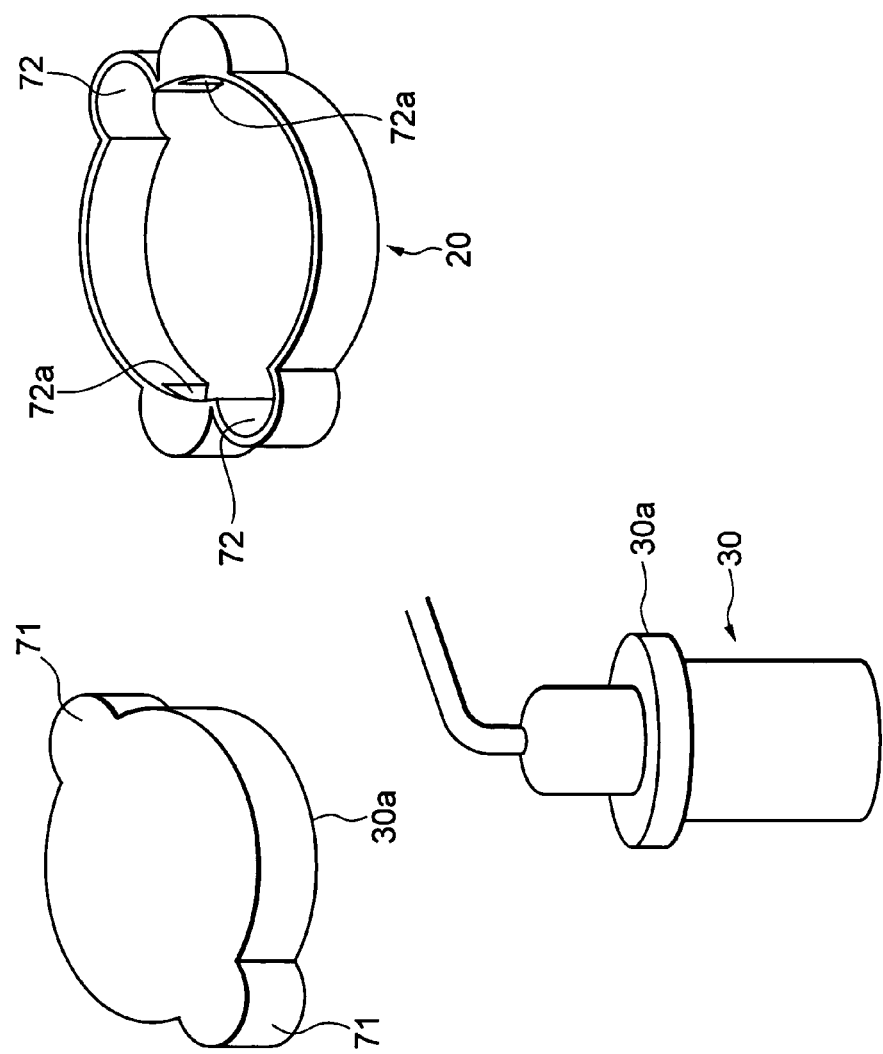
FIG. 18 is a perspective view of a sensor for detecting a speed of rotation and a sensor holder of the hub unit for a driving wheel according to a variation of the eighth embodiment of the present invention.

FIG. 18 is a perspective view of a sensor for detecting a speed of rotation and a sensor holder of the hub unit for a driving wheel according to a variation of the eighth embodiment of the present invention.

In this variation, the sensor 30 for detecting a speed of rotation is provided with a flange 30a on the outer periphery thereof, and this flange 30a is fitted in the inner side of the cylindrical sensor holder 20.

Also, the flange 30a is formed with the convex portions 71 each having a substantially arc-like shape, while the sensor holder 20 is formed with concave portions 72 each having a substantially arc-like shape. Adjacently to the concave portion 72, there is formed the peaked recessive part 72a for performing ratchet fixing.

As a result, when the convex portions 71 of the flange 30a is fitted in the concave portion 72 of the sensor holder 20 and then the flange 30a and the sensor holder 20 are rotated relatively to each other, the convex portion 71 is fitted in the peaked recessive part 72a like a ratchet, and the convex portion 71 having a substantially arc-like shape and the peaked recessive part 72a are brought into ratchet fitting to be fixed.

As described above, in the present embodiment, since the convex portion 71 having a substantially arc-like shape and the peaked recessive part 72a can be brought into ratchet fitting with each other to be fixed, the sensor holder 20 can have a simplified shape. Further, since the elasticity is not used as a principal retaining force, there is no deterioration in the retaining performance, so that the fixing performance between the sensor 30 for detecting a speed of rotation and the sensor holder 20 can be enhanced.

Also, as shown in FIGS. 17A to 17C and FIG. 18, the sensor 30 for detecting a speed of rotation or the sensor holder 20 except the ratchet fitting portion may take a fan-like shape, as shown in FIGS. 17A to 17C, may take a cylindrical shape, as shown in FIG. 18, and may take another shape.

Note that the present invention is not limited to the foregoing embodiments, but can be altered in various manners.

What is claimed is:

1. A hub unit for a driving wheel in which:
   one track ring out of a stationary ring and a rotary ring is an outer ring having a plurality of outer ring tracks on the inner peripheral surface thereof;
   the other track ring of the stationary ring and the rotary ring is an inner ring assembly comprising a shaft member and inner ring as a separate body combined with each other and having a plurality of inner ring tracks on the outer peripheral surface thereof;
   the shaft member is formed with one of the inner ring tracks in a middle part in the axial direction thereof and a small-diameter step portion having a smaller diameter than that of the inner ring track portion at an end portion in the axial direction thereof; and
   said separate inner ring has the other of the inner ring tracks on the outer peripheral surface thereof and is fitted on said small-diameter step portion;
   the hub unit comprising:
   a sensor holder fixed to the stationary ring of the hub unit for a driving wheel;
   a sensor supported by said sensor holder and facing an encoder fixed to said rotary ring to rotate together with said rotary ring; and
   a harness or connector extended out of said sensor for taking out a detection signal of the sensor,
   wherein the sensor holder includes an annular metal portion and a resin portion formed integrally therewith, the annular metal portion having integrally a portion fixedly fitted to said stationary ring an annular portion radially inwardly extended from the fixedly fitted portion and an end portion extended axially from a radially inner end of the annular portion over an inner diameter portion of said resin portion, said resin portion being integrally formed with said radially extended annular portion and said axially extended end portion;
   the sensor that is annular, is fixed to the resin portion of the sensor holder with a plurality of screws spaced apart circumferentially from each other;

the sensor unit includes said sensor and said harness or connector;

all of the portions of said sensor unit provided outside the outer ring in the axial direction and inside a range of a hub unit mounting hole of a knuckle are disposed on the inner side in the radial direction than an inner wall of the hub unit mounting hole of the knuckle;

said harness or connector is disposed on the outer side in the radial direction in a non-contact manner with a constant velocity universal joint in a finished car;

said sensor is an active sensor;

a sensing portion of said sensor directly faces said encoder without interposition between it and said encoder; and said harness or connector is extended out of a gap between said knuckle and said constant velocity universal joint.

2. A hub unit for a driving wheel according to claim 1, wherein the sensor is formed with a plurality of concaved holes each for receiving the head of the screw.

* * * * *